Figure 1:
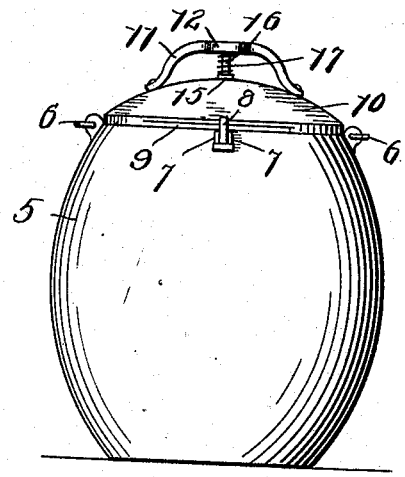

W. G. RUSBY.
STEAM COOKER.
APPLICATION FILED SEPT. 13, 1906.

923,894.

Patented June 8, 1909.

Witnesses
L. Armstrong
James W. Dunn

Inventor
W. G. Rusby
By Chandler & Chandler
Attorneys

UNITED STATES PATENT OFFICE.

WILLIE GLEN RUSBY, OF CUERVO, TERRITORY OF NEW MEXICO.

STEAM-COOKER.

No. 923,894.  Specification of Letters Patent.  Patented June 8, 1909.

Application filed September 13, 1906. Serial No. 334,470.

*To all whom it may concern:*

Be it known that I, WILLIE G. RUSBY, a citizen of the United States, residing at Cuervo, in the county of Guadalupe, Territory of New Mexico, have invented certain new and useful Improvements in Steam-Cookers; and I do hereby declare the following to be a full, clear, and exact description of the invention, such as will enable others skilled in the art to which it appertains to make and use the same.

The invention relates to a cooking vessel and more particularly to the class of cooking vessels having covers detachably locked in position on the vessel.

The primary object of the invention is the provision of a vessel having mounted thereon at diametrically opposite points near its mouth portion pivotal catches adapted to be swung into and out of engagement with flared lips projecting horizontally from a lid or cover at opposite points so that upon rotation of the lid or cover upon the mouth edge of the vessel the said lips can be positioned in the path of movement of the catches which latter are adapted to be swung into a locked position with the lips to secure the lid or cover on the vessel and in event the lid or cover should become stuck in the mouth portion of the vessel the said pivotal catches can be swung to a released position from engagement with the lips thereby permitting free removal of the cover or lid from the vessel.

A further object of the invention is the provision of an annular groove upon the under face of the lid or cover in which the upper edge or rim of the vessel fits thus affording a steam tight joint between the two.

In the drawings accompanying and forming part of this specification is illustrated the preferred form of embodiment of the invention which to enable those skilled in the art to practice the invention, will be set forth at length in the following description while the novelty of the invention will be included in the claim succeeding said description. However changes, variations and modifications may be resorted to such as come properly within the scope of the claim hereunto appended without departing from the spirit of the invention.

Figure 2:
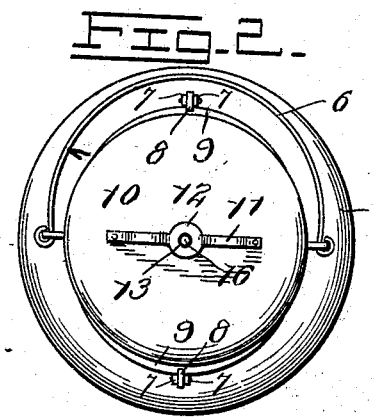
Figure 3:
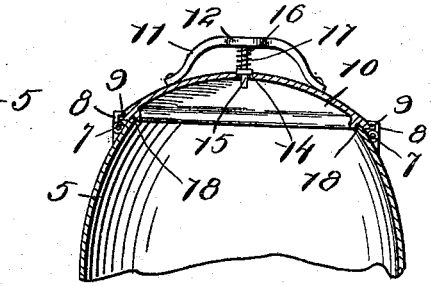

In the drawings: Figure 1 is a side elevation of the invention. Fig. 2 is a plan view of the cover. Fig. 3 is a vertical central section through Fig. 2 showing also the catches carried by the vessel and the cover in its locked position.

Similar reference characters indicate corresponding parts throughout the several views in the drawings.

In the drawings, there is shown a vessel 5 provided with a bail 6 of conventional form and having spaced ears 7 arranged in pairs and projecting upwardly from the vessel at diametrically opposite points thereof near the mouth portion of the same and pivotally connected between the spaced ears 7 are catches 8 adapted to be swung into and out of engagement with horizontally disposed lips 9 of crescent shape formed on and projecting outwardly at diametrically opposite points of a lid 10. The extremities of the lips 9 at opposite sides thereof meet the peripheral edge of said lid 10 whereby the said lips will engage or disengage the catches 8 upon the turning of the said lid 10 in either direction upon the vessel. In event that the catches 8 are in locked engagement with the lips 9 and the said lid 10 becomes stuck upon the vessel, the said catches 8 can be swung outwardly from locked engagement with the lips, thereby permitting the cover to be freely removed from the vessel. The lid 10 is rotated to bring the lips in position for locking engagement with the catches and this is effected by means of a handle 11 secured to the top of the lid and which handle is provided with a central enlargement 12 having an opening 13 therein. The lid is provided with a valve seat 14 in alinement with the handle opening 13 in which the safety valve 15 fits, the stem 16 projects through the opening in the handle. The valve stem is provided with a coiled spring 17 surrounding the same and bearing at opposite ends against the underface of the handle and the upper face of the valve to hold the same yieldingly in place in its seat.

To effect a perfect steam tight joint between the vessel and its lid an annular groove 18 is formed in the underface of the vessel and in which groove the rim of the vessel fits.

Normally the catches 8 are positioned so as to engage the lips 9 of the lid when the same is turned or rotated in either direction to bring the said lips 9 under the catches and should the said lid become stuck to prevent the rotation of the lid the said catches 8 are moved outwardly on their pivots from locked engagement with the lips whereas in this manner the said lid can be readily lifted or removed from the mouth of the vessel.

What is claimed is—

In a vessel, a body having spaced ears formed on the same at diametrically opposite points near its mouth portion, a lid removably fitted upon the body and having an annular rib projecting from its inner face forming a bearing for engagement with the mouth edge of the body, horizontally disposed lips on said lid and arranged at diametrically opposite points thereof and each provided with a crescent-shaped edge and catches pivotally mounted between said ears and adapted to swing into and out of locking engagement with the said lips upon positioning the latter in the path of movement of the catches, the said crescent-shaped edges of the lips permitting the release of the lid when rotated in opposite directions without unlocking the catches.

In testimony whereof, I affix my signature, in presence of two witnesses.

WILLIE GLEN RUSBY.

Witnesses:
  JUAN SENA,
  MAX SALAS.